(12) United States Patent
Haynes et al.

(10) Patent No.: US 7,073,865 B2
(45) Date of Patent: Jul. 11, 2006

(54) TUNED VIBRATION ABSORBING SYSTEM FOR A SEAT SYSTEM

(75) Inventors: Ian D. Haynes, Windsor (CA); Matthew Kipf, Farmington Hills, MI (US); Jon Liu, Royal Oak, MI (US); Robert Buono, Manchester, MI (US); Vikas Patwardhan, Northville, MI (US)

(73) Assignee: Lear Corporation, Southfield, MI (US)

( * ) Notice: Subject to any disclaimer, the term of this patent is extended or adjusted under 35 U.S.C. 154(b) by 234 days.

(21) Appl. No.: 10/613,251

(22) Filed: Jul. 3, 2003

(65) Prior Publication Data

US 2005/0001465 A1   Jan. 6, 2005

(51) Int. Cl.
*B60N 2/44* (2006.01)

(52) U.S. Cl. ............... 297/463.2; 296/1.03; 296/63; 297/217.1

(58) Field of Classification Search ........... 297/188.04, 297/188.06, 188.14, 188.18, 217.1, 463.2; 296/1.03, 63; 248/562; 188/378, 379, 268
See application file for complete search history.

(56) References Cited

U.S. PATENT DOCUMENTS

| | | | | |
|---|---|---|---|---|
| 638,645 A * | 12/1899 | Pinckney | ............... | 297/188.06 |
| 3,568,805 A * | 3/1971 | Reed, III | ................ | 188/378 |
| 4,011,397 A * | 3/1977 | Bouche | ................ | 248/636 |
| 4,401,342 A * | 8/1983 | Andersson | ............. | 297/216.16 |
| 4,706,788 A * | 11/1987 | Inman et al. | ............... | 188/378 |
| 5,358,305 A | 10/1994 | Kaneko et al. | | |
| 5,582,385 A | 12/1996 | Boyle et al. | | |
| RE35,572 E * | 7/1997 | Lloyd et al. | ................ | 248/562 |
| 5,652,704 A | 7/1997 | Catanzarite | | |
| 5,712,783 A | 1/1998 | Catanzarite | | |
| 5,873,438 A | 2/1999 | Osterberg et al. | | |
| 5,915,508 A | 6/1999 | Lai | | |
| 5,983,168 A | 11/1999 | Michler | | |
| 6,105,839 A * | 8/2000 | Bell | ............... | 224/275 |
| 6,125,977 A * | 10/2000 | Nekomoto et al. | ......... | 267/136 |
| 6,439,443 B1 * | 8/2002 | Liao | ............... | 224/275 |
| 6,454,063 B1 | 9/2002 | Osterberg et al. | | |

* cited by examiner

*Primary Examiner*—Peter R. Brown
(74) *Attorney, Agent, or Firm*—Earl J. LaFontaine

(57) ABSTRACT

A tuned vibration absorbing system (12) for a seat system (10) includes a flexible extension member (32) that is coupled to the seat system (10). A suspended element (34) is coupled to the flexible extension member (32). The flexible extension member (32) and the suspended element (34) are configured to absorb vibration within the seat system (10). A method of designing and manufacturing a seat system (10) includes designing the tuned vibration absorbing system (12) with the flexible extension member (32) and the suspended element (34) to absorb vibration within the seat system (10), which is then manufactured and coupled to the seat system (10).

20 Claims, 4 Drawing Sheets ism. The desire to have a seat system with a greater natural frequency than the vehicle suspension is due to the potential magnification affect on natural frequencies of bodily organs, which are generally below 12 Hz.

TUNED VIBRATION ABSORBING SYSTEM FOR A SEAT SYSTEM

TECHNICAL FIELD

The present invention relates to noise, vibration, and harshness (NVH) performance characteristics of a seat system. More particularly, the present invention relates to a system for reducing NVH characteristics of a seat system and to a method of increasing design and development efficiency of a seat system to satisfy desired NVH performance requirements.

BACKGROUND OF THE INVENTION

During the development and manufacturing of a seat system for an automotive vehicle multiple design and performance requirements must be satisfied. These design and performance requirements may be separated into various categories, including esthetic features, creature comfort and convenience specifications, seat system vehicle collision performance parameters, NVH performance characteristics, as well as other categories known in the art.

All of the above stated categories are not mutually exclusive, but rather are interrelated such that adjustment of an element in one category can affect elements in other categories. For example, to reduce NVH characteristics of a seat system the stiffness of the seat system is generally increased. However, when stiffness of a seat system is increased, seat system performance during a rear collision event is generally worse. Thus, a balanced relationship exists between NVH and collision performance characteristics of a seat system.

As another example, when adjusting the mass of a seat system, natural frequency of the seat system changes affecting NVH performance of the seat system. Depending upon the vehicle and the type of suspension contained therein, a vehicle typically experiences a "wheel hop" frequency of approximately between 12–17 Hz. It is desirable for a seat system to have a natural frequency of at least 1.5 Hz different, than the vehicle, so that wheel hop is not magnified in the seat system, which causes the seat system to resonate. Therefore, another balanced relationship exists between the mass of a seat system and NVH performance.

Additionally, it is not only desirable for a seat system to have a natural frequency that is at least 1.5 Hz different from that of the vehicle suspension, but that the seat system natural frequency also be greater than that of the vehicle suspension. The desire to have a seat system with a greater natural frequency than the vehicle suspension is due to the potential magnification affect on natural frequencies of bodily organs, which are generally below 12 Hz.

A significant and extensive amount of development and testing time and costs are typically involved and spent in order to satisfy requirements associated with each of the above stated categories. Often seat system parameters are repeatedly adjusted and readjusted to satisfy these requirements and many times the modifications are performed after a seat system has been designed, assembled and tested. The modifications occur in response to undesirable NVH test results of a complete seat system.

It is therefore desirable to provide a system for minimizing NVH characteristics of a seat system and a method for improving efficiency in design and development of the seat system. It is also desirable for the system to be simple, lightweight, and inexpensive to implement and manufacture.

SUMMARY OF THE INVENTION

The present invention addresses the issues described above and provides a tuned vibration absorbing system for a seat system. The tuned vibration absorbing system includes a flexible extension member that is coupled to the seat system. A suspended element is coupled to the flexible extension member. The flexible extension member and the suspended element are configured to absorb vibration within the seat system.

A method of designing and manufacturing a seat system is also provided and includes designing the tuned vibration absorbing system with the flexible extension member and the suspended element to absorb vibration within the seat system. The vibration absorbing system is then manufactured and coupled to the seat system.

One of several advantages of the present invention is that it provides a tuned vibration absorbing system that minimizes NVH characteristics of the seat system.

Another advantage of the present invention is that it provides a seat system that is simple and inexpensive to implement and manufacture.

Furthermore, it is another advantage of the present invention to provide a seat system that is compact and lightweight, which allows it to be utilized within tight spatial constraints of a seat system.

Moreover, it is yet another advantage of the present invention to provide an efficient method of designing and manufacturing a seat system that satisfies various NVH performance requirements as well as other seat system associated requirements.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein.

DESCRIPTION OF THE PREFERRED EMBODIMENT(S)

Figure 1:
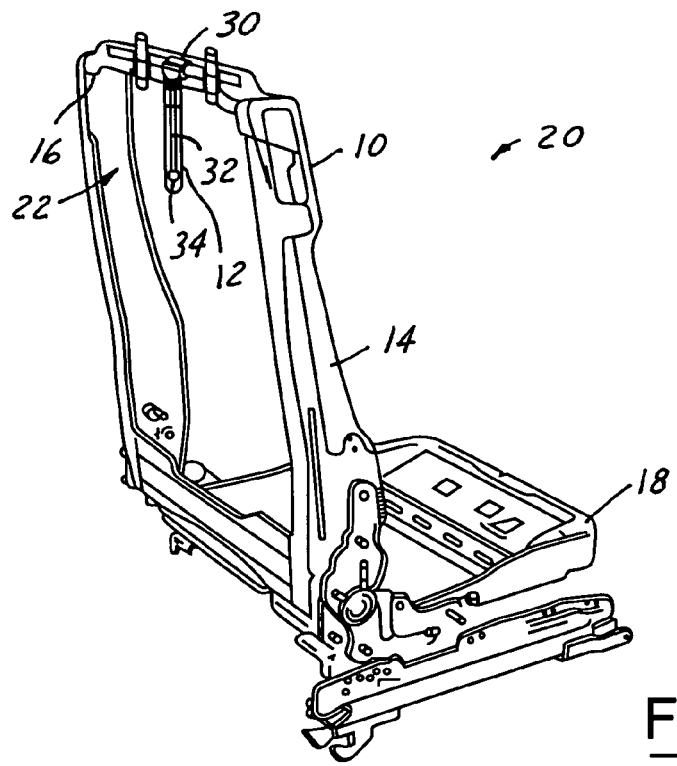
FIG. 1 is a rear perspective view of a seat system for a vehicle incorporating a tuned vibration absorbing system in accordance with an embodiment of the present invention.

In the following figures the same reference numerals will be used to refer to the same components. While the present invention is described with respect to a system for reducing NVH characteristics of a seat system and to a method of increasing design and development efficiency of a seat system to satisfy desired NVH performance requirements, the present invention may be adapted and applied in various seat system applications as well as other applications requiring use of a vibration absorbing system.

In the following description, various operating parameters and components are described for one constructed embodiment. These specific parameters and components are included as examples and are not meant to be limiting.

Although the present invention is preferably applied in and is described below with respect to an unoccupied seat system, the present invention may be applied in an occupied, or partially occupied seat system. The present invention is preferably applied to an unoccupied seat system, since NVH characteristics, especially natural frequency of a seat system significantly changes when the seat system is occupied. The term "occupied" refers to any animate or inanimate object separate from the seat system itself that is located on the seat system.

Figure 2:
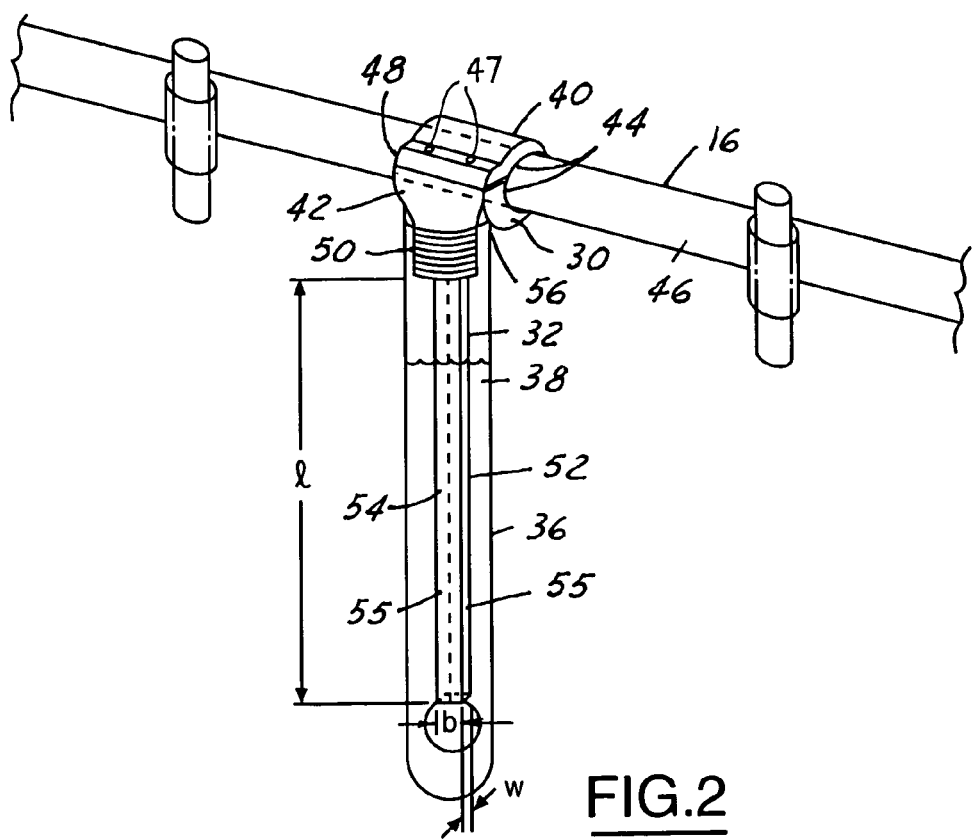
FIG. 2 is a close-up perspective view of a tuned vibration absorbing system in accordance with an embodiment of the present invention.

Referring now to FIGS. 1 and 2, a rear perspective view of a seat system 10 for a vehicle incorporating a tuned vibration absorbing system 12 and a close-up perspective view of the absorbing system 12 are shown in accordance with an embodiment of the present invention. The seat system 10 includes a seat back 14 having a seat back frame 16, which is coupled to a seat pan 18. The absorbing system 12 absorbs vibrations or resonance of the seat system 10, thereby reducing NVH performance characteristics of the seat system 10. The seat system 10 and the absorbing system 12 together form a combined non-resonating seat system 20. Although the absorbing system 12 is preferably coupled within an upper portion 22 of the seat system 10 and to the seat frame 16, it may be coupled in other various locations of the seat system 10. The higher the position of the absorbing system 12 relative to the seat system 10, the more of a vibration absorbing effect it exhibits on the seat system 10.

The absorbing system 12 may include a seat system attachment mechanism 30 for coupling the system 12 to the seat frame 16. Alternatively, the system 12 may be integrally formed with the seat frame 16 as a single unit. A flexible extension member 32 is coupled to and extends from the attachment mechanism 30. A suspended element 34 is coupled to the flexible member 32 and is suspended from the seat frame 16. Although only one attachment mechanism, one flexible member, and one suspended element are shown and utilized in the embodiment of FIG. 1, any number of these devices may be used.

The flexible member 32 and the suspended element 34 resonate at a natural frequency $\omega_{vas}$ that corresponds with a natural frequency $\omega_{seat}$ of the seat system 10. The flexible member 32 and the suspended element 34, in so doing, prevent vibration of the seat system 10, which is explained in further detail below. The flexible member 32 and the suspended element 34 may be contained within a housing 36 having fluid 38 contained therein, as shown. The fluid 38 damps vibration of the flexible member 32 and the suspended element 34 further absorbing the vibration of the seat system 10.

The attachment mechanism 30 includes an upper bracket member 40 and a lower bracket member 42, each of which have semi-circular inner sections 44. The members 40 and 42 extend around a seat frame element 46 and are coupled to each other via fasteners (not shown) extending through holes 47 in flanges 48 (only one flange is shown). The attachment mechanism 30 also includes a threaded portion 50 for coupling the housing 36 thereon.

Although, the attachment mechanism 30 is shown in the form of a tubular clamping mechanism it may be in some other form known in the art. The attachment mechanism 30 may be in the form of a tie wrap, a wrapped wire, or may even be in the form of threaded holes or inserts (not shown) within the seat frame element 46 that allow the flexible member 32 to be threaded into the seat frame element 46.

The flexible member 32 may be of various sizes, shapes, weights, and styles known in the art. It is preferred that the flexible member 32 be non-cylindrical in shape and that it has a first rectangular cross-sectional surface area and a second rectangular cross-sectional surface area, which are represented by designators 52 and 54. For the embodiment as shown, external surface areas of sides 55 are equal in size and dimension as that of the cross-sectional surfaces areas 52 and 54. In one embodiment of the present invention, the flexible member 32 is in the form of a six-sided rectangular polyhedron having base b, width w, and length l dimensions, as shown. The first rectangular surface area 52 and a second rectangular surface area 54 have a corresponding first bending moment and a corresponding second bending moment, respectively. The first bending moment is directly related to a fore and aft natural frequency $\omega_{fa}$ of the seat system 10 and the second bending moment is directly related to a lateral or cross directional natural frequency $\omega_{lat}$ of the seat system 10. In having both the fore and aft natural frequency $\omega_{fa}$ and the lateral natural frequency $\omega_{lat}$, the absorbing system 12 minimizes vibration of the seat system 10 in the fore and aft directions as well as laterally. The flexible member 32 may be in the form of a rod, a wire, a string, a chain, or in some other form known in the art.

The suspended element 34 may be coupled to the flexible element 32 using various fastening techniques known in the art, such as being threaded, tied, bolted, or adhered to the flexible member 32 or may be integrally formed with the flexible member as a single unit. The suspended element 34 may also be of various sizes, shapes, weights, and styles known in the art. The suspended element 34 has a mass $m_b$, which is significantly heavier than that of mass $m_f$ of the flexible member.

The housing 36 may be in the form of a vessel, as shown, so as to be at least partially filled with the fluid 38. The housing 36 may be coupled to the attachment mechanism 30 using various methods known in the art or may be directly coupled to the seat frame 16. The housing 36 may also be of various sizes, shapes, and styles known in the art. The housing 36 has a seal 56 that mates with the attachment mechanism 30 and prevents fluid from exiting the housing 36. The seal 56 may be in the form of an o-ring, a rubber seal, a gasket, a sealing paste, or other sealant or sealing device known in the art. The fluid 38 may be of various types, such as distilled water, glycerin, mineral oil, antifreeze, or other material or combination thereof having viscous characteristics as to provide damping characteristics to the absorbing system 12.

The attachment mechanism 30, the flexible member 32, the suspended element 34, and the housing 36 may be formed of various materials, such as polypropylene, steel, nylon, or delron, as well as other materials known in the art.

Figure 6:
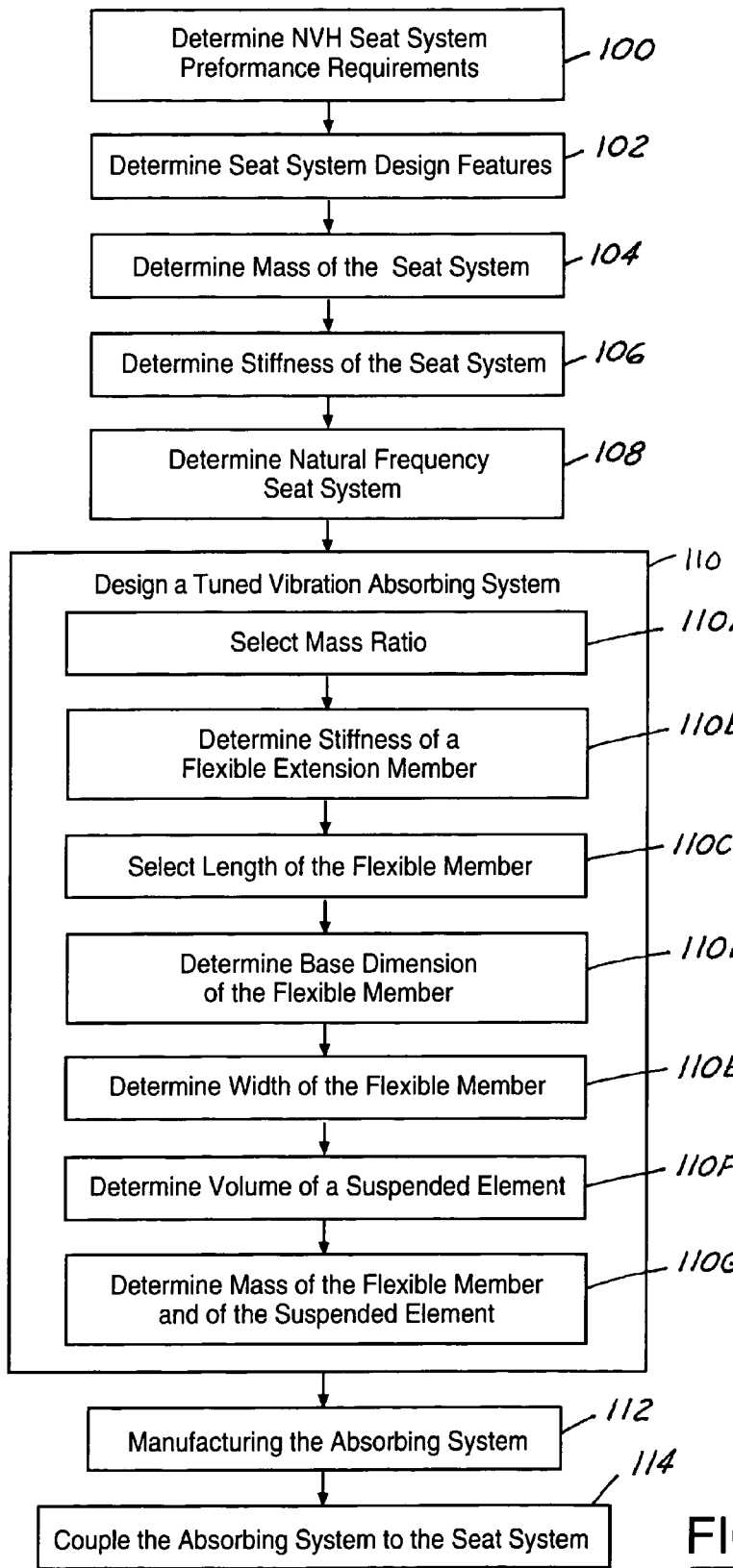
FIG. 6 is a logic flow diagram illustrating a method of designing and manufacturing the seat system having the tuned vibration absorbing system in accordance with an embodiment of the present invention.

Referring now to FIG. 6, a logic flow diagram illustrating a method of designing and manufacturing the seat system 10 having the absorbing system 12 is shown in accordance with an embodiment of the present invention. Although, the following steps are described with respect to the embodiment of FIG. 1, they may be applied to and be modified for other embodiments of the present invention.

In step 100, the NVH seat system performance requirements are determined. For example, a desired seat system natural frequency or frequency range may be determined as well as magnitude limitations thereof. A desired seat system natural frequency is typically between approximately 12–17 Hz and is at least 1.5 Hz different than that of a vehicle suspension system.

In step 102, the seat system design features are determined. The design features may be roughly determined in response to the NVH seat system performance requirements such that a resulting seat system natural frequency is approximately within the above-stated range. Unlike traditional seat systems, the seat system of the present invention does not need to necessarily be within the stated seat system natural frequency range, since the absorbing system 12 is designed to minimize vibration of the seat system 10. The absorbing system 12 is designed to absorb vibrations at the seat system natural frequency whether it is within or outside the stated frequency range. The absorbing system 12 resonates rather than the seat system 10. Thus, the absorbing system 12, provides an increased amount of flexibility in design and selection of design features for the seat system 10.

The design features may include seat platform, seat size, shape, style, weight, materials to be used in forming the seat system 10, as well as other design features known in the art. The design features may include whether the seat system 10 has power position adjustment features and heating or cooling features and corresponding devices included therein. The design features may also include collision performance characteristics.

In step 104, the mass of the seat system $m_{seat}$ is determined in response to the design features, simply by summing mass off all internal components of the seat system 10.

In step 106, the stiffness of the seat system $k_{seat}$ is determined in response to the design features utilizing techniques known in the art. Fore and aft stiffness $k_{fa}$ and lateral stiffness $k_{lat}$ may be determined.

In step 108, natural frequency of the seat system $\omega_{seat}$ is determined in response to the inertial mass $m_{seat}$ and the stiffness $k_{seat}$ using equation 1. Similar equations to that of equation 1 may be used for determining fore and aft natural frequency $\omega_{fa}$ and lateral natural frequency $\omega_{lat}$, as is best represented by equations 8 and 9 below.

$$\omega_{seat} = \sqrt{\frac{k_{seat}}{m_{seat}}} \quad (1)$$

In step 110, the absorbing system 12 is designed in response to the seat system frequency $\omega_{seat}$ including determining the dimensions and mass of the flexible member 32 and of the suspended element 34.

The magnification factor, which is directly proportional to frequency ratio magnitude for the seat system 10 and for the absorbing system 12 is represented by equations 2 and 3, where $M_1(\omega,i)$ is the magnification factor of the seat system 10, $M_2(\omega, i)$ is the magnification factor of the absorbing system 12, $\omega$ is the frequency the seat system 10 is being driven, $\omega_{vas}$ is the natural frequency of the absorbing system 12, and i is a range variable for plotting. The mass ratio $\mu$ is equal to the mass of the absorbing system 12 divided by the mass $m_{seat}$. The magnification factor of the combined system 20 is represented by $M_s(\omega,i)$ in equation 4.

$$M_1(\omega, i) = \frac{1 - \frac{\omega^2}{\omega_{vas}^2}}{\left(1 + \mu_i \frac{\omega_{vas}^2}{\omega_{seat}^2} - \frac{\omega^2}{\omega_{seat}^2}\right)\left(1 - \frac{\omega^2}{\omega_{vas}^2}\right) - \mu_i \frac{\omega_{vas}^2}{\omega_{seat}^2}} \quad (2)$$

$$M_2(\omega, i) = \frac{1}{\left(1 + \mu_i \frac{\omega_{vas}^2}{\omega_{seat}^2} - \frac{\omega^2}{\omega_{seat}^2}\right)\left(1 - \frac{\omega^2}{\omega_{vas}^2}\right) - \mu_i \frac{\omega_{vas}^2}{\omega_{seat}^2}} \quad (3)$$

$$M_s(\omega, i) = \quad (4)$$

$$\sqrt{\frac{\left(2\frac{c_i}{c_c}\frac{\omega}{\omega_{seat}}\frac{\omega_{vas}}{\omega_{seat}}\right)^2 + \left[\left(\frac{\omega}{\omega_{seat}}\right)^2 - \left(\frac{\omega_{vas}}{\omega_{seat}}\right)^2\right]^2}{\left(2\frac{c_i}{c_c}\frac{\omega}{\omega_{seat}}\frac{\omega_{vas}}{\omega_{seat}}\right)^2\left[\left(\frac{\omega}{\omega_{seat}}\right)^2 - 1 + \mu\left(\frac{\omega}{\omega_{seat}}\right)^2\right]^2 + \left[\mu\left(\frac{\omega}{\omega_{seat}}\right)^2\left(\frac{\omega_{vas}}{\omega_{seat}}\right)^2 - \left[\left(\frac{\omega}{\omega_{seat}}\right)^2 - 1\right]\left[\left(\frac{\omega}{\omega_{seat}}\right)^2 - \left(\frac{\omega_{vas}}{\omega_{seat}}\right)^2\right]\right]^2}}$$

The damping factor $c_i$ and critical damping factor $c_c$ are represented by equations 5 and 6, using a target damping factor $c_{max}$ represented by equation 7.

$$c_i = \frac{i}{n} c_{max} \quad (5)$$

$$c_{max} = \frac{\sqrt{2}}{2}\sqrt{\mu(\mu+3)\frac{1+\sqrt{\frac{\mu}{\mu+2}}}{1+\mu}} \mu m_s \omega_s \quad (6)$$

$$c_c = 2m_{vas}\omega_{seat} \quad (7)$$

The target damping factor $c_{max}$ corresponds with the target damping level of the absorbing system 12 used as configured in the embodiment of FIG. 1.

Figure 3:
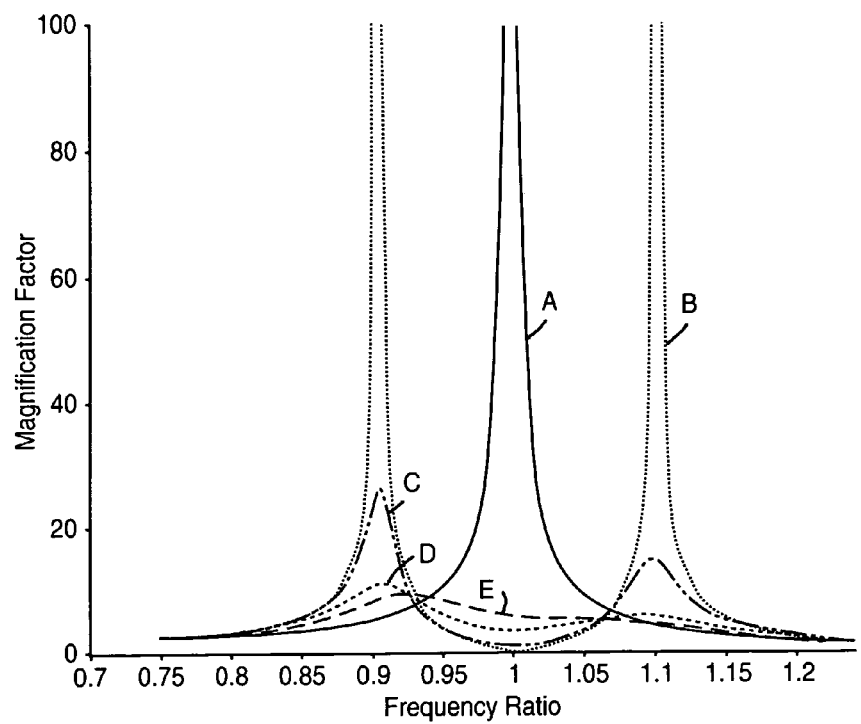
FIG. 3 is a plot of magnification factor versus natural frequency ratio of the seat system with the tuned vibration absorbing system damped and in accordance with an embodiment of the present invention.

Referring now to FIG. 3, a plot of magnification factor versus natural frequency ratio of the seat system 10 without the absorbing system 10 and with the absorbing system 10 having varying levels of damping in accordance with an embodiment of the present invention is shown. The varying levels of damping are due to changes in the fluid 38, such as the fluid type and amount of fluid within the housing 36. The curve A represents frequency response of just the seat system 10. The curve B represents the seat system 10 having the absorbing system 12 without damping or fluid 38. The curves C, D, and E represent the seat system having the absorbing system 10 with a damping factor $c_i$ approximately equal to 0.2 $C_{max}$, 0.6 $C_{max}$, and $C_{max}$, respectively.

From equations 1–7 the mass ratio $\mu$ can be determined to be approximately 0.25 and the frequency ratio, which is equal to the natural frequency of the absorbing system 12 divided by the natural frequency of the seat system $\omega_{seat}$, can be determined to be approximately equal to 0.8. Since a seat system 10 can have a mass of up to 50–60 lbf, the flexible member 32 and the suspended element 34 can have as a result a combined mass of approximately 13 lbf or nearly 6 Kg. It is desirable to minimize weight of the seat system 10 and therefore it is undesirable for the combined mass to be 13 lbf, but rather it is preferred that the combined mass be significantly less.

In step 110A, a mass ratio is selected. It is generally easier to adjust the mass ratio μ than it is to adjust the frequency ratio. Thus, the mass ratio μ is selected to provide a relatively lightweight suspended element and the frequency ratio is adjusted to compensate for the difference in mass ratio of 0.25 and the selected mass ratio μ. For example, in one embodiment of the present invention, the mass ratio μ is selected to be 0.004, which is a mass ratio that provides a significantly reduced mass of the absorbing system 12, or approximately 3.3 oz. When the mass ratio μ is decreased, the magnification factor of the combined system 20 is more dependant upon the frequency ratio, which is thereby increased to be approximately equal to 1.0. With the frequency ratio equal to 1.0, the flexible member 32 and the suspended element 34 have natural frequencies $\omega_{fa}$ and $\omega_{lat}$ that are approximately equal to corresponding natural frequencies of the seat system 10.

Figure 4:
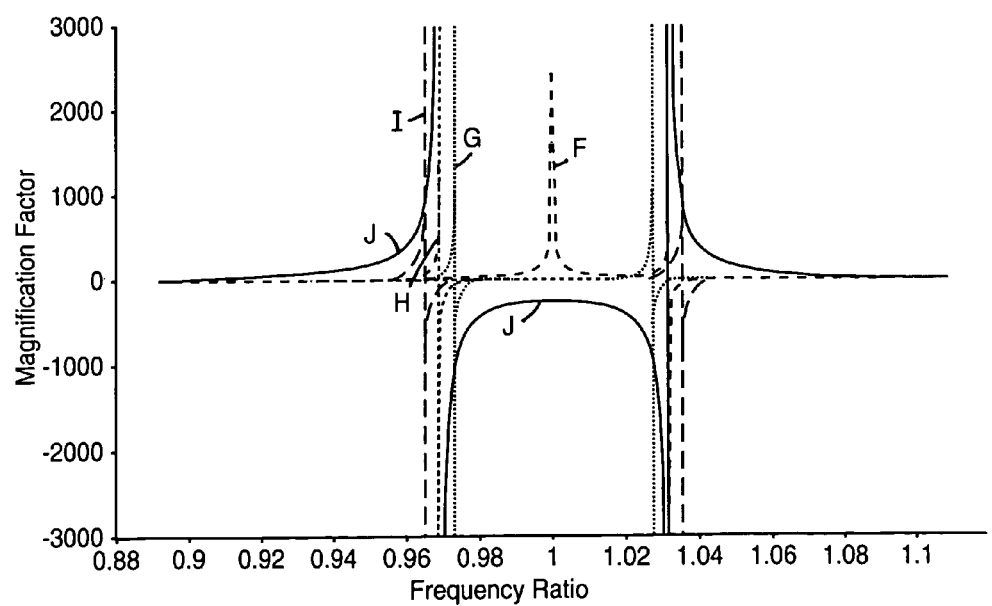
FIG. 4 is a comparison plot of magnification factor versus natural frequency ratio of the seat system, of the seat system with the tuned vibration absorbing system undamped and having various mass ratios, and of the tuned vibration absorbing system alone and undamped and in accordance with an embodiment of the present invention.
Figure 5:
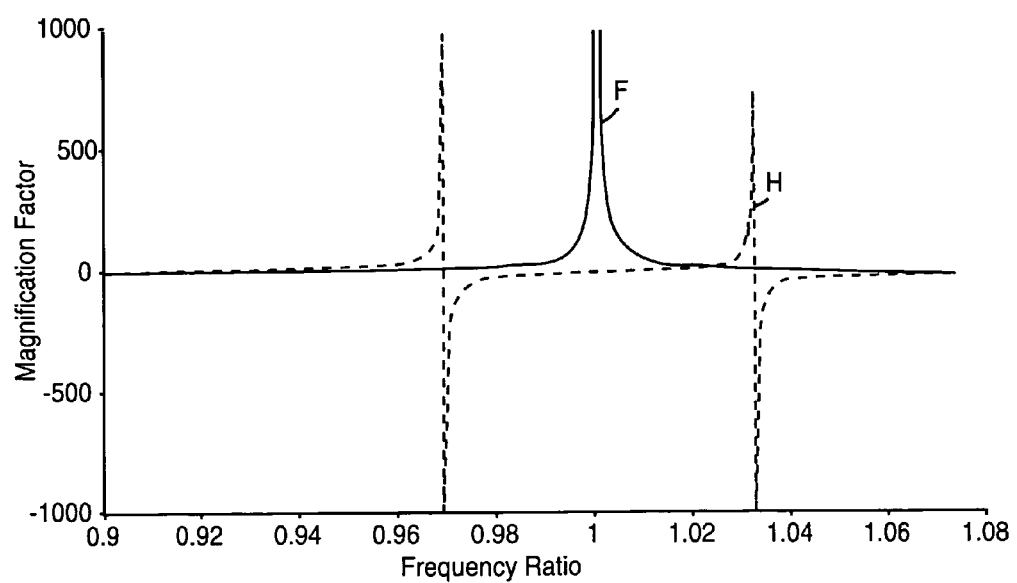
FIG. 5 is a comparison plot of magnification factor versus natural frequency ratio of the seat system and of the seat system with the tuned vibration absorbing system undamped and in accordance with an embodiment of the present invention.

Referring now to FIGS. 4 and 5, comparison plots of magnification factor versus natural frequency ratio of the seat system 10, of the seat system 10 with an the absorbing system 12 undamped having various mass ratios, and of the absorbing system 12 alone and undamped in accordance with an embodiment of the present invention are shown. The curves F represent response of just the seat system 10. The curves G, H, and I represent response of the seat system 10 including the absorbing system 12 having mass ratios μ of 0.003, 0.004, and 0.005, respectively. The curves J represent response of just the absorbing system 12 having a mass ratio μ of 0.004. The mass ratio μ is selected not only to minimize weight of the flexible member 32 and of the suspended element 34, but also to minimize existence and magnitude of split resonance peaks within a frequency ratio response curve. The mass ratio μ of 0.004 is selected since it has a corresponding split resonance response curve H having split resonance peaks with minimum magnitude and width.

In step 110B, the stiffness of the flexible member 32 in the fore and aft directions $k_{fa}$ and laterally $k_{lat}$ are determined using equations 8 and 9 with known values for the mass of the suspended element $m_b$, the flexible member fore and aft natural frequency $\omega_{fa}$, and the flexible member lateral natural frequency $\omega_{lat}$, where natural frequencies $\omega_{fa}$ and $\omega_{lat}$ have a 1:1 relationship with fore and aft and lateral natural frequencies of the seat system 10.

$$\omega_{fa} = \sqrt{\frac{k_{fa}}{m_b}} \quad (8)$$

$$\omega_{lat} = \sqrt{\frac{k_{lat}}{m_b}} \quad (9)$$

The flexible member 32 being in the form of a six-sided rectangular polyhedron has the two rectangular surface areas 52 and 54 that each have a corresponding directional section moment of inertia or bending moment, as stated above. A fore and aft bending moment $I_{fa}$ is directly related to the fore and aft natural frequency $\omega_{fa}$ and a lateral bending moment $I_{lat}$ is directly related to the lateral natural frequency $\omega_{lat}$, which may be determined using and are represented by equations 10–14, where E represents Young's Modulus.

$$I_{fa} = \frac{bw^3}{12} \quad (10)$$

$$I_{lat} = \frac{b^3 w}{12} \quad (11)$$

$$\omega_{fa}(m) = \sqrt{\frac{3EI_{fa}}{(m + 0.23m_b)l^3}} \quad (12)$$

$$\omega_{lat}(m) = \sqrt{\frac{3EI_{lat}}{(m + 0.23m_b)l^3}} \quad (13)$$

$$b \cong \frac{.355}{\omega_{fa}E}(m_{seat}l^3 \omega_{lat}^3 \omega_{fa}^3 E^3)^{1/4} \quad (14)$$

Equation 14 is derived from manipulation of equations 10–13.

In step 110C, a dimension of the flexible member 32 is selected. For the embodiment describes the length l of the flexible member 32 is selected. In step 110D, the base dimension b is determined using equation 11 and known values of the mass of the seat $m_{seat}$, the flexible member fore and aft natural frequency $\omega_{fa}$, the flexible member lateral natural frequency $\omega_{lat}$, and Young's Modulus E. In step 110E, the width dimension w is determined using equation 15.

$$w = \frac{\omega_{fa}}{\omega_{lat}} b \quad (15)$$

The base dimension b and the width dimension w of the flexible member 32 may be different and are each related to the frequency ratio. Each are also directly related to stiffness of the flexible member 32.

In step 110F, the volume of the suspended element 34 is determined. In one embodiment of the present invention, the suspended element 34 is in the shape of a sphere, therefore, the volume of the sphere is determined by solving for radius r using equation 16, which is an expression relating weight of the seat system 10 with weight of the absorbing system 12. The radius r of the sphere is determined using the known mass of the suspended element $m_b$ and by selecting a weight density ρ of the flexible member 32 and of the suspended element 34. The weight density of the flexible member 32 and of the suspended element 34, in the embodiment as described, are set equal to each other to minimize size and costs of the flexible member 32 and of the suspended element 34.

$$m_{seat}g = \frac{1}{\mu}\rho\left(lbh + \frac{4}{3}\pi r^3\right) \quad (16)$$

In step 110G, the mass of the flexible member $m_f$ and of the suspended element $m_b$ are determined using equations 17 and 18 and known values of base b, width w, length l, density ρ, and gravity g.

$$m_f = \frac{bhl\rho}{g} \quad (17)$$

$$m_b = \frac{\frac{4}{3}\pi r^3 \rho}{g} \qquad (18)$$

In step 112, the absorbing system 12 is manufactured. The flexible member 32 and the suspended element 34 may be formed of various materials as stated above, which are selected in correspondence with the determined mass, stiffness, weight density, and dimension factors determined in steps 110B–110F.

In step 114, the combined system 20 is assembled by coupling the absorbing system 12 to the seat system 10.

The above-described steps are meant to be illustrative examples; the steps may be performed sequentially, synchronously, simultaneously, or in a different order depending upon the application. Also, the above selected values may be modified depending upon the application.

The present invention provides a vibration absorbing system for a seat system of a vehicle that minimizes vibrations or resonance of the seat system at natural frequency of the seat system. The present invention increases flexibility in design and manufacturability of a seat system and minimizes time and costs involved therein. The present invention is simple, lightweight, inexpensive and may be easily modified for use in various seat system applications.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A tuned vibration absorbing system for a seat system comprising:
    at least one seat system vibration absorbing flexible extension member coupled to the seat system; and
    at least one suspended element coupled to said at least one flexible extension member;
    said at least one flexible extension member and said at least one suspended element have an associated vibration frequency that is approximately equal to a vibration frequency of the seat system and are configured to absorb vibration within the seat system.

2. A system as in claim 1 further comprising:
    at least one seat system attachment mechanism coupled between the seat system and said at least one flexible extension member.

3. A system as in claim 2 further comprising:
    at least one housing coupled to said at least one seat system attachment mechanism and containing said at least one flexible extension member and said at least one suspended element.

4. A system as in claim 3 wherein said at least one seat system attachment mechanism comprises a threaded portion for threading said at least one housing thereon.

5. A system as in claim 3 wherein said housing is at least partially filled with a fluid.

6. A system as in claim 2 further comprising:
    at least one vessel coupled to said at least one seat system attachment mechanism and containing said at least one flexible extension member, said at least one suspended element, and a fluid.

7. A system as in claim 2 wherein said at least one seat system attachment mechanism comprises a tubular clamping mechanism.

8. A system as in claim 1 wherein said at least one flexible extension member and said at least one suspended element have a natural frequency that is approximately equal to natural frequency of the seat system.

9. A system as in claim 1 wherein said at least one flexible extension member and said at least one suspended element are integrally formed as a single unit.

10. A system as in claim 1 wherein said at least one flexible extension member is noncylindrical in shape.

11. A system as in claim 1 wherein said at least one flexible extension member comprises:
    a first rectangular cross-sectional surface area having a corresponding first bending moment; and
    a second rectangular cross-sectional surface area having a corresponding second bending moment.

12. A system as in claim 11 wherein said first bending moment is directly related to a fore and aft natural frequency of the seat system and said second bending moment is directly related to a lateral natural frequency of the seat system.

13. A seat system comprising:
    a tuned vibration absorbing system comprising;
        a housing;
        a seat system attachment mechanism coupled to a seat frame;
        a flexible extension member at least partially contained within said housing and coupled to said seat system attachment mechanism; and
        a suspended element coupled to said flexible extension member.

14. A system as in claim 13 wherein said seat system attachment mechanism is coupled to an upper portion of the seat system.

15. A system as in claim 13 wherein said seat system attachment mechanism is coupled to an upper portion of a seat back of the seat system.

16. A system as in claim 13 wherein said seat system attachment mechanism threads into a seat frame of the seat system.

17. A method of designing and manufacturing a seat system having a tuned vibration absorbing system comprising:
    determining a vibration frequency of the seat system;
    designing the tuned vibration absorbing system having at least one flexible extension member and at least one seat system vibration absorbing suspended element that absorb vibration at least at approximately said vibration frequency within the seat system;
    manufacturing the tuned vibration absorbing system; and
    coupling the tuned vibration absorbing system to the seat system.

18. A method as in claim 17 wherein designing the tuned vibration absorbing system comprises designing said at least one flexible extension member and said at least one suspended element to have a natural frequency that is approximately equal to a natural frequency of the seat system.

19. A method as in claim 17 wherein designing the tuned vibration absorbing system comprises:
    tuning a first rectangular cross-sectional surface area of said at least one flexible extension member to have a first bending moment; and
    tuning a second rectangular cross-sectional surface area of said at least one flexible extension member to have a second bending moment.

20. A method as in claim 17 further comprising:
determining seat system design features;
determining mass of the seat system in response to said design features;
determining stiffness of the seat system in response to said design features;
determining natural frequency of the seat system in response to said mass and said stiffness; and
designing the tuned vibration absorbing system in response to said natural frequency of the seat system.

* * * * *